US009851974B2

(12) United States Patent
Gschwind et al.

(10) Patent No.: US 9,851,974 B2
(45) Date of Patent: *Dec. 26, 2017

(54) SELECTIVE SUPPRESSION OF INSTRUCTION CACHE-RELATED DIRECTORY ACCESS

(71) Applicant: INTERNATIONAL BUSINESS MACHINES CORPORATION, Armonk, NY (US)

(72) Inventors: Michael K. Gschwind, Chappaqua, NY (US); Valentina Salapura, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 63 days.

This patent is subject to a terminal disclaimer.

(21) Appl. No.: 15/135,891

(22) Filed: Apr. 22, 2016

(65) Prior Publication Data
US 2017/0199743 A1 Jul. 13, 2017

Related U.S. Application Data

(63) Continuation of application No. 14/990,984, filed on Jan. 8, 2016, now Pat. No. 9,354,885.

(51) Int. Cl.
G06F 9/30 (2006.01)
G06F 9/38 (2006.01)
G06F 12/0875 (2016.01)

(52) U.S. Cl.
CPC ........ G06F 9/3808 (2013.01); G06F 9/30058 (2013.01); G06F 9/30145 (2013.01); G06F 12/0875 (2013.01); G06F 2212/452 (2013.01)

(58) Field of Classification Search
None
See application file for complete search history.

(56) References Cited

U.S. PATENT DOCUMENTS 4,142,234 A 2/1979 Bean et al.
5,774,710 A 6/1998 Chung et al.
(Continued)

FOREIGN PATENT DOCUMENTS

CN 103257850 A 8/2013
EP 10006438 A1 6/2000

OTHER PUBLICATIONS

U.S. Appl. No. 15/135,891, filed Apr. 22, 2016.
(Continued)

Primary Examiner — William B Partridge
(74) Attorney, Agent, or Firm — Steven Chiu, Esq.; Kevin P. Radigan, Esq.; Heslin, Rothenberg, Farley & Mesiti

(57) ABSTRACT

Processing of an instruction fetch from an instruction cache is provided, which includes: determining whether the next instruction fetch is in a same cache line of the instruction cache as a last instruction fetch; and based, at least in part, on determining that the next instruction fetch is in the same cache line, suppressing for the next instruction fetch one or more instruction cache-related directory accesses, and forcing for the next instruction an address match signal for the same cache line. The suppressing may include generating a known-to-hit signal where the next fetch is in the same cache line, and the last fetch is not a branch instruction, and issuing an instruction cache hit where a cache line segment of the same cache line having the next instruction has a valid validity bit, the valid validity bit having been retrieved and maintained based on a most-recent, instruction cache-directory-accessed fetch.

16 Claims, 14 Drawing Sheets

(56) References Cited

U.S. PATENT DOCUMENTS

| | | |
|---|---|---|
| 6,560,679 B2 | 5/2003 | Choi et al. |
| 6,678,815 B1 | 1/2004 | Mathews et al. |
| 8,145,874 B2 | 3/2012 | Venkumahanti et al. |
| 8,914,580 B2 | 12/2014 | Goel et al. |
| 2004/0003298 A1 | 1/2004 | Luick |
| 2004/0003308 A1 | 1/2004 | Luick |
| 2006/0242365 A1 | 10/2006 | Ali et al. |
| 2006/0282621 A1 | 12/2006 | Moyer et al. |
| 2008/0164933 A1 | 7/2008 | Gschwind et al. |
| 2008/0222392 A1 | 9/2008 | Fuchs et al. |

OTHER PUBLICATIONS

U.S. Appl. No. 14/990,984, filed Jan. 8, 2016.
U.S. Appl. No. 14/990,989, filed Jan. 8, 2016.
Mell, Peter and Tim Grance, "The NIST Definition of Cloud Computing," National Institute of Standards and Technology, Information Technology Laboratory, Special Publication 800-145, Sep. 2011, pp. 1-7.
Gavin et al., "Reducing Instruction Fetch Energy in Multi-Issue Processors", ACM Transactions on Architecture and Code Optimization, vol. 10, No. 4, Article 64 (Dec. 2013) (24 pages).
IBM, "z/Architecture—Principles of Operation," IBM Publication No. SA22-7832-10, Eleventh Edition, Mar. 2015, pp. 1-1732.
IBM, "Power ISA—V 2.07B," Apr. 9, 2015, pp. 1-1527.
Gschwind et al., "Selective Suppression of Instruction Translation Lookaside Buffer (ITLB) Access", U.S. Appl. No. 14/990,989, filed Jan. 8, 2016 (50 pages).
Gschwind et al., "Selective Suppression of Instruction Cache-Related Directory Access", U.S. Appl. No. 14/990,984, filed Jan. 8, 2016 (51 pages).
Gschwind et al., Notice of Allowance for U.S. Appl. No. 14/990,984, filed Jan. 8, 2016, dated Mar. 7, 2016 (15 pages).
Gschwind et al., "List of IBM Patents and Patent Applications Treated As Related", U.S. Appl. No. 15/135,891, filed Apr. 22, 2016 dated Apr. 22, 2016 (2 pages).
Gschwind et al., Notice of Allowance for U.S. Appl. No. 14/990,989, filed Jan. 8, 2016, dated Oct. 12, 2017 (pp. 1-15).

SELECTIVE SUPPRESSION OF INSTRUCTION CACHE-RELATED DIRECTORY ACCESS

BACKGROUND

One or more aspects of the present invention relate, in general, to processing within a computing environment, and more particularly, to processing an instruction fetch from an instruction cache of the computing environment.

As is well known, a processor is a computing device that executes instructions to operate upon data in a computing environment. The instructions used by the processor are generally stored in memory. Typically, a processor may include one or more cache memories to allow faster access to frequently used instructions, and/or data. These cache memories may include an instruction cache and a data cache.

The instruction cache is typically divided into multiple cache lines, each having multiple cache line segments of instructions, and accesses or fetches to instructions are typically performed in a sequential manner. Consequently, when an instruction cache line includes, for instance, four or eight cache line segments, typically all four or eight cache line segments of the cache line may be accessed in a sequential manner. By way of example, a 32-byte line segment size may equate to 8 instructions, which means that a cache line holding 128 or 256 bytes would equate to 32 or 64 instructions, respectively, in the cache line.

Commonly, an instruction cache may have associated therewith one or more directories, such as an instruction directory (IDIR), which contains for each cache line in the cache the address of the memory location that is stored in that cache line. If the cache is set associative, then the instruction directory is also set associative. Additionally, the one or more directories may include an instruction translation lookaside buffer (ITLB) containing virtual address to physical address mapping. The instruction translation lookaside buffer is sometimes alternatively referred to as an instruction effective-to-real address translation (IERAT) directory.

Typically, for each cache access, one or more cache-related directory accesses are performed to obtain, for instance, the corresponding cache-directory entry to verify its correctness.

SUMMARY

Shortcomings of the prior art are overcome and additional advantages are provided through the provision of a method of processing an instruction fetch from an instruction cache. The method includes, for instance: determining for a next instruction fetch whether the next instruction fetch is in a same cache line of the instruction cache as a last instruction fetch from the instruction cache; and based, at least in part, on determining that the next instruction fetch is in the same cache line, suppressing for the next instruction fetch one or more instruction cache-related directory accesses, and forcing for the next instruction an address match signal for the same cache line.

Advantageously, the method(s) of processing an instruction fetch from an instruction cache described herein enhances operation of the computing environment by, for instance, reducing power dissipation within the instruction cache complex, and thus heat generated, to process a next instruction fetch from the instruction cache, where the next instruction fetch is in the same cache line a last instruction fetch.

In one or more embodiments, the suppressing may include generating a known-to-hit signal where the next instruction fetch is in the same cache line, and the last instruction fetch is not a branch instruction, and further issuing an instruction cache hit where a cache line segment of the same cache line including the next instruction has a valid validity bit associated therewith, the valid validity bit having been retrieved and maintained based on a most-recent, instruction cache-directory-accessed fetch for the same cache line.

In addition, in one or more embodiments, where the next instruction fetch is in the same cache line, and the last instruction is a branch instruction, the method may include ascertaining whether the branch instruction is to a location within the same cache line of the instruction cache, and if so, proceeding with generating the known-to-hit signal.

In combination with any of the noted embodiments, the method may include refraining from the suppressing where there has been an invalidation action against the same cache line, causing the same cache line to no longer be valid. The invalidation action may result in the known-to-hit signal being negated, or not being generated.

Where the same cache line includes multiple cache line segments, each cache line segment including multiple instructions, the method may include maintaining validity information for each cache line segment of the multiple cache line segments based on a most-recent, instruction cache-directory-accessed fetch from the instruction cache for the same cache line. In such a case, the suppressing may include generating a known-to-hit signal based, at least in part, on the determining that the next instruction fetch is in the same cache line, and the method may include issuing a cache line hit for the next cache line fetch where the separate validity bit for the cache line segment including the next instruction is valid, and the known-to-hit signal has been generated, without performing for the next instruction fetch the one or more instruction cache-related directory accesses.

Further, maintaining the validity information may include maintaining separate validity bits for each cache line segment in a cycle-boundary latch of the instruction cache complex which includes the instruction cache.

By way of example, in one or more implementations, suppressing the one or more instruction cache-related directory accesses may include suppressing for the next instruction fetch an instruction directory (IDIR) lookup associated with the instruction cache, and suppressing for the next instruction fetch an instruction address translation directory lookup associated with the instruction cache. Further, the suppressing may include suppressing for the next instruction fetch and address-compare looking for a match between the instruction directory lookup and the instruction address translation directory lookup.

Systems and computer program products relating to one or more of the aspects noted herein, are also described and claimed.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

One or more aspects of the present invention provided herein relate to an instruction cache complex. An instruction cache complex is advantageously provided with logic to selectively suppress access to one or more instruction cache-related directories of the complex, such as an instruction directory (IDIR) and an instruction translation lookaside buffer (ITLB), or instruction effective-to-real address translation (IERAT) directory. By selectively suppressing directory checks for a next instruction fetch, unnecessary processing and power dissipation within the instruction cache complex is avoided, thereby saving power and reducing heat dissipation.

One embodiment of a computing environment to incorporate and/or use one or more aspects of the present invention is described with reference to FIG. 1. In one example, computing environment 100 includes at least one computer system/server 102, which is operational with numerous other general purpose or special purpose computing system environments or configurations. Examples of well-known computing systems, environments, and/or configurations that may be suitable for use with computer system/server 102 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 102 may be described in the general context of computer system-executable instructions, such as program modules, being executed by a computer system. Generally, program modules may include routines, programs, objects, components, logic, data structures, and so on that perform particular tasks or implement particular abstract data types.

Figure 1:
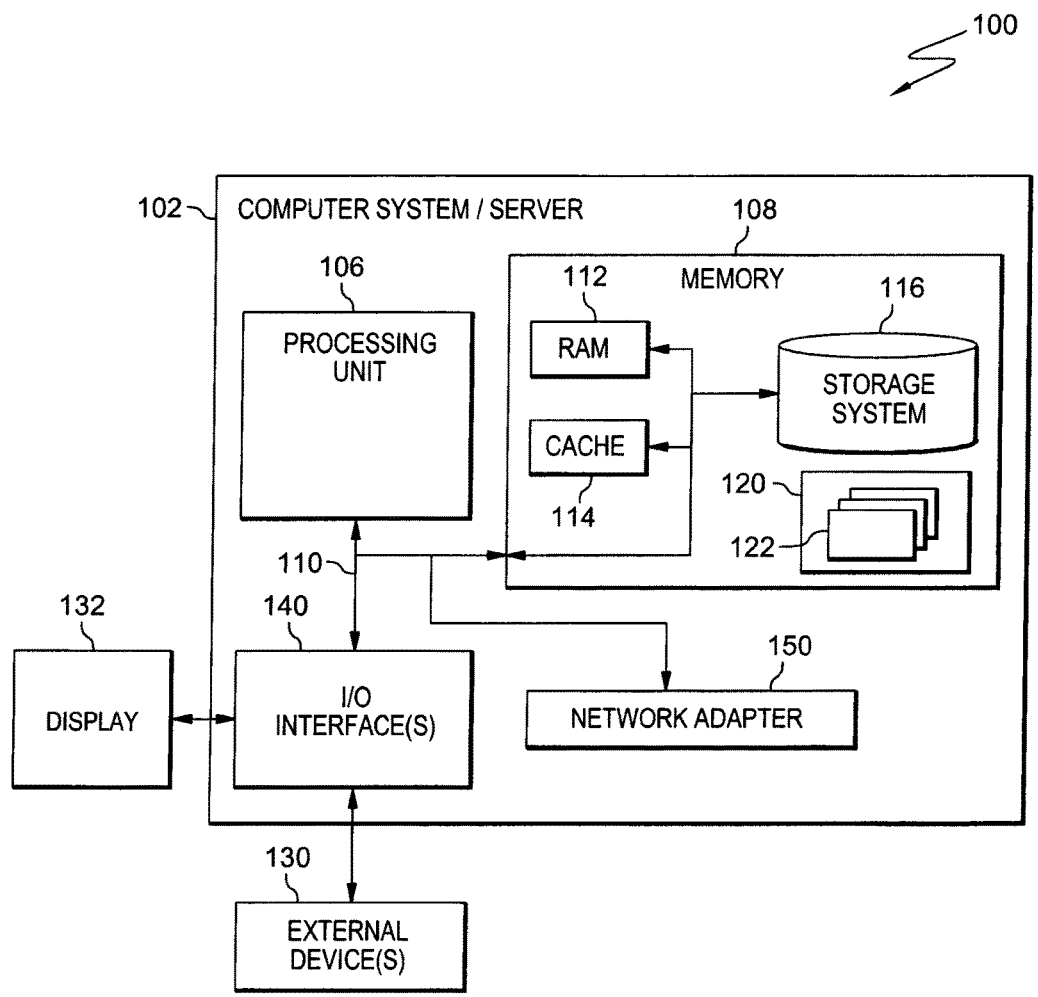
FIG. 1 depicts one example of a computer system/server of a computing environment to incorporate and/or use one or more aspects of the present invention.

As depicted in FIG. 1, computer system/server 102 is shown in the form of a general-purpose computing device. The components of computer system/server 102 may include, but are not limited to, one or more processors or processing units 106, a system memory 108, and a bus 110 that couples various system components including system memory 108 to processor 106.

In one embodiment, processor 106 is based on the z/Architecture offered by International Business Machines Corporation, or other architectures offered by International Business Machines Corporation or other companies. z/Architecture is a registered trademark of International Business Machines Corporation, Armonk, N.Y., USA. One embodiment of the z/Architecture is described in "z/Architecture Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 102 typically includes a variety of computer system readable media. Such media may be any available media that is accessible by computer system/server 102, and it includes both volatile and non-volatile media, removable and non-removable media.

System memory 108 can include computer system readable media in the form of volatile memory, such as random access memory (RAM) 112 and/or cache memory 114. Computer system/server 102 may further include other removable/non-removable, volatile/non-volatile computer system storage media. By way of example only, storage system 116 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 110 by one or more data media interfaces. As will be further depicted and described below, memory 108 may include at least one program product having a set (e.g., at least one) of program modules that are configured to carry out the functions of embodiments of the invention.

Program/utility 120, having a set (at least one) of program modules 122, may be stored in memory 108 by way of example, and not limitation, as well as an operating system, one or more application programs, other program modules, and program data. Each of the operating system, one or more application programs, other program modules, and program data or some combination thereof, may include an implementation of a networking environment. Program modules 122 generally carry out the functions and/or methodologies of embodiments of the invention as described herein.

Computer system/server 102 may also communicate with one or more external devices 130 such as a keyboard, a pointing device, a display 132, etc.; one or more devices that enable a user to interact with computer system/server 102; and/or any devices (e.g., network card, modem, etc.) that enable computer system/server 102 to communicate with one or more other computing devices. Such communication can occur via Input/Output (I/O) interfaces 140. Still yet, computer system/server 102 can communicate with one or more networks such as a local area network (LAN), a general wide area network (WAN), and/or a public network (e.g., the Internet) via network adapter 150. As depicted, network adapter 150 communicates with the other components of computer system/server 102 via bus 110. It should be understood that although not shown, other hardware and/or software components could be used in conjunction with computer system/server 102. Examples, include, but are not limited to: microcode, device drivers, redundant processing units, external disk drive arrays, RAID systems, tape drives, and data archival storage systems, etc.

Figure 2A:
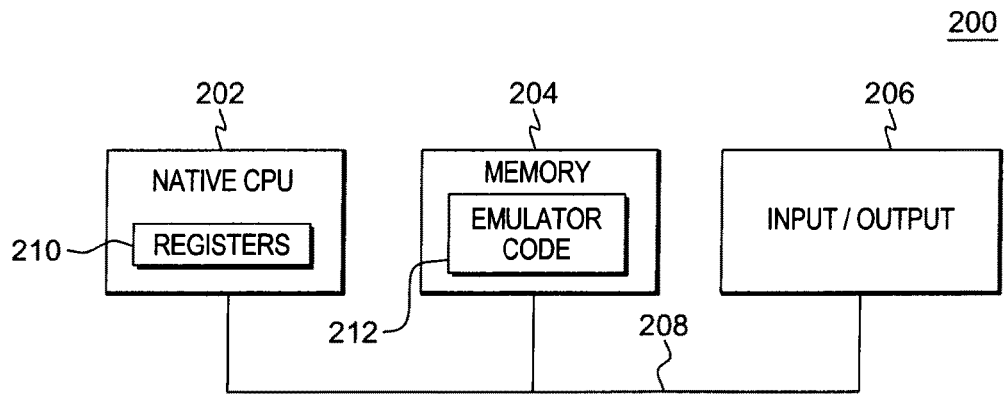
FIG. 2A depicts another example of a computing environment to incorporate and/or use one or more aspects of the present invention.

Another embodiment of a computing environment to incorporate and use one or more aspects is described with reference to FIG. 2A. In this example, a computing environment 200 includes, for instance, a native central processing unit 202, a memory 204, and one or more input/output devices and/or interfaces 206 coupled to one another via, for example, one or more buses 208 and/or other connections. As examples, computing environment 200 may include a PowerPC processor, a zSeries server, or a pSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 202 includes one or more native registers 210, such as one or more general purpose registers and/or one or more special purpose registers used during processing within the environment. These registers include information that represents the state of the environment at any particular point in time.

Moreover, native central processing unit 202 executes instructions and code that are stored in memory 204. In one particular example, the central processing unit executes emulator code 212 stored in memory 204. This code enables the processing environment configured in one architecture to emulate another architecture. For instance, emulator code 212 allows machines based on architectures other than the Power architecture, such as zSeries servers, pSeries servers, HP Superdome servers or others, to emulate the Power architecture and to execute software and instructions developed based on the Power architecture. In a further example, emulator code 212 allows machines based on architectures other than the z/Architecture, such as PowerPC processors, pSeries servers, HP Superdome servers or others, to emulate the z/Architecture and to execute software and instructions developed based on the z/Architecture. Other architectures may also be emulated.

Figure 2B:
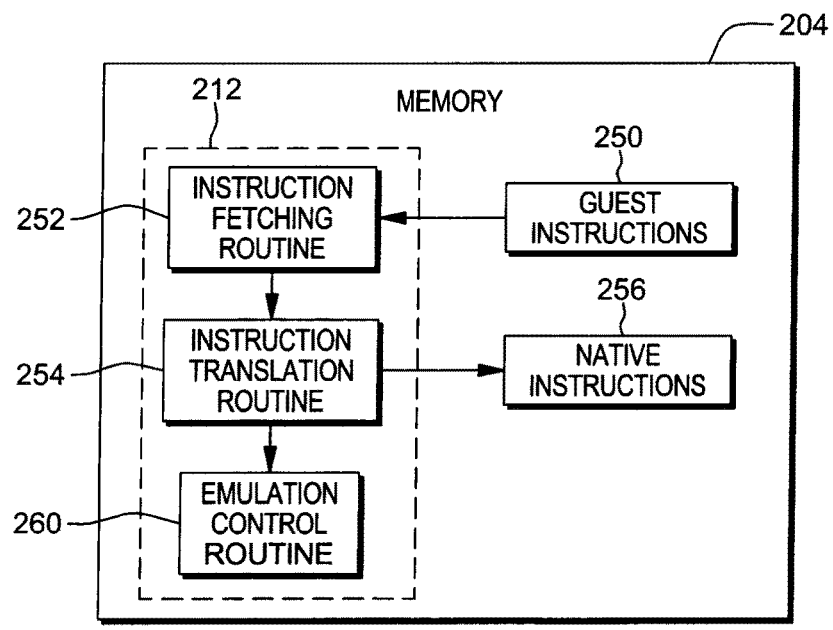
FIG. 2B depicts further details of the memory of FIG. 2A.

Further details relating to emulator code 212 are described with reference to FIG. 2B. Guest instructions 250 stored in memory 204 comprise software instructions (e.g., correlating to machine instructions) that were developed to be executed in an architecture other than that of native CPU 202. For example, guest instructions 250 may have been designed to execute on a PowerPC processor or a z/Architecture processor, but instead, are being emulated on native CPU 202, which may be, for example, an Intel Itanium II processor. In one example, emulator code 212 includes an instruction fetching routine 252 to obtain one or more guest instructions 250 from memory 204, and to optionally provide local buffering for the instructions obtained. It also includes an instruction translation routine 254 to determine the type of guest instruction that has been obtained and to translate the guest instruction into one or more corresponding native instructions 256. This translation includes, for instance, identifying the function to be performed by the guest instruction and choosing the native instruction(s) to perform that function.

Further, emulator code 212 includes an emulation control routine 260 to cause the native instructions to be executed. Emulation control routine 260 may cause native CPU 202 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, guest instructions 250, native instructions 256 and emulator code 212 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

As noted briefly above, within a processing environment, a processor may have associated therewith cache memories, including, for instance, an instruction cache and a data cache. Instructions or data may be transferred between memory and the respective cache in blocks of fixed size, referred to as cache lines. When a cache line is copied from memory into the respective cache, a cache entry is created. The cache entry includes the copied instruction(s) or data, as well as the requested memory location (referred to as a tag).

When the processor needs to read or write a location in main memory, it first checks for a corresponding entry in the cache. The cache checks for the contents of the requested memory location and any cache lines that might contain that address. If the processor finds that the memory location is in the cache, a cache hit has occurred. However, if the processor does not find that the memory location is in the cache, a cache miss has occurred. In the case of a cache hit, the processor immediately reads or write the data in the cache line. For a cache miss, the cache allocates a new entry and copies the data from main memory, then the request is fulfilled from the contents of the cache.

Typically, the processor has associated therewith multiple caches, including, for example, an instruction cache to speed up executable instruction fetches, a data cache to speed up data fetches and store, and a translation lookaside buffer (TLB) used to speed up virtual-to-physical address translation for both executable instructions and data.

Aspects of the present invention relate to the instruction cache, or more generally, to the instruction cache complex. Instruction accesses are typically performed in a sequential manner. Further, an instruction cache line typically includes, for example, four or eight segments, for instance, of 32-byte size, which equals eight instructions per segment, as one example. Thus, in a cache line holding 128 or 256 bytes, then 32 or 64 instructions may be present, and typically, all four or eight segments of the cache line may be accessed in a sequential manner. Further, for each cache access, an instruction cache-related directory access for the next instruction is performed to obtain a corresponding cache-directory entry to verify its correctness. Since all segments of a cache line share that directory entry, this can lead to multiple directory accesses to the same entry, potentially wasting energy. Similarly, for each directory access, an address translation is also typically accessed. As described herein, these instruction cache-related directory accesses are, in certain circumstances, unnecessary, and may be selectively suppressed.

Figure 3:
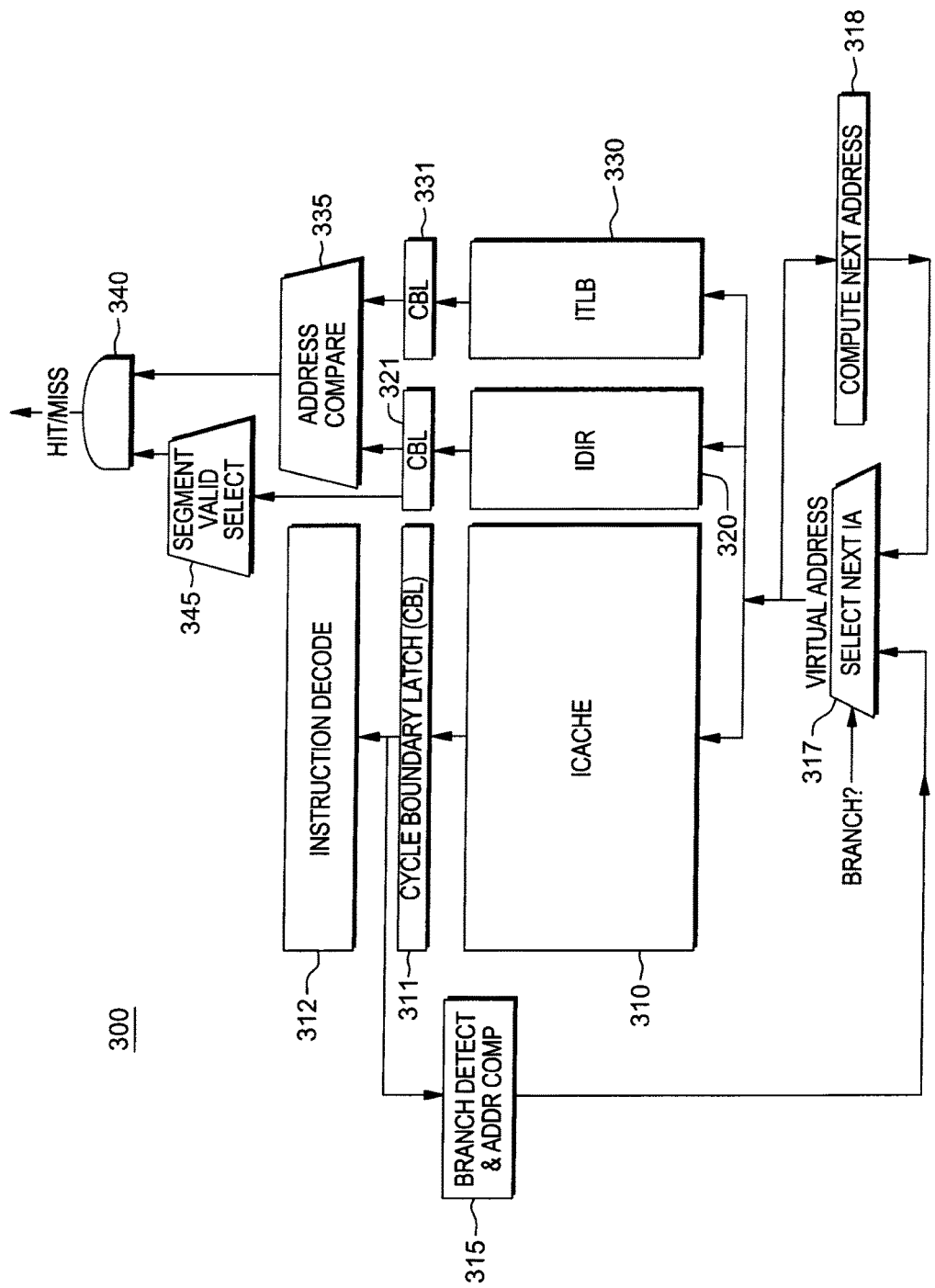
FIG. 3 is a schematic of one embodiment of an instruction cache complex for access by a processor of a computing environment, in accordance with one or more aspects of the present invention.

FIG. 3 depicts one example of an instruction cache complex, generally denoted 300, which may be accessed by a processor of a computing environment. Note that although depicted together, the logic of instruction cache complex 300 could be dispersed within the computing environment. By way of example, since most processors today implement some form of virtual memory, instruction cache complex 300 typically includes an instruction cache 310, an instruction directory (IDIR) 320, and an instruction address translation directory, such as a translation lookaside buffer (ITLB) 330. Instruction cache 310 includes multiple instruction cache lines, with each instruction cache line having multiple cache line segments, and each cache line segment including multiple instructions, which may be, for instance, substantially, sequentially executed. Instruction directory (IDIR) 320 contains for each instruction cache line the address in memory of the instruction that is stored in that cache line. If the instruction cache is set associative, then instruction directory 320 is also set associative. The cache directories also include the instruction translation lookaside buffer (ITLB) 330, or alternatively, an instruction effective-to-real address translation (IERAT) directory.

With an instruction hit being provided by hit/miss logic 340, an instruction is retrieved from the appropriate instruction cache line in instruction cache 310 and maintained in a cycle-boundary latch (CBL) 311 for instruction decode 312 for processing in the next cycle. Output from branch detect and branch target address compute logic 315 is input to select next virtual instruction address 317 logic to determine the next virtual address fetch logic. Another input to select next virtual instruction address 317 logic is the result of compute next instruction address 318 logic to determine the next sequential fetch address. If a branch is present, an indicator causes select logic 317 to select the branch target address. Otherwise, select logic 317 selects the next sequential fetch address as the address from which to fetch the next instruction.

Conventionally, for a next instruction fetch, processing accesses the instruction directory 320 to obtain the physical memory address of the instruction stored in the corresponding instruction cache line. For the entire cache line, this information is maintained in a cycle-boundary latch 321 for processing in the next cycle (or subsequent cycles), and includes validity information for each segment of the cache line, such as a respective segment validity bit. The validity information is read by segment valid-select logic 345, which provides input to hit/miss logic 340, for use in determining whether there is a cache hit or miss for the next instruction. The instruction translation lookaside buffer (ITLB) 330 is also accessed to perform address translation to obtain the physical address corresponding to the virtual (effective) address of the fetch address, so as to ascertain that the instruction cache line corresponds to the present virtual address, as a check against the value obtained from the instruction directory (IDIR) 320, which commonly stores physical addresses, in one embodiment. The output of the instruction translation lookaside buffer (ITLB) 330 is maintained by a respective cycle-boundary latch 331, and the addresses in cycle-boundary latches 321, 331 are compared by address-compare logic 335 to determine whether there is a match in the next cycle, in one pipelined embodiment. If so, an instruction cache hit is signaled, that is, assuming that the segment-valid select logic 345 reads that a valid bit is set for the cache line segment containing the next instruction. Otherwise, if the segment is invalid, a cache miss is signaled even upon an address match between the addresses returned by the IDIR and ITLB.

The instruction cache-related directory accesses, such as to the instruction directory (IDIR) and the instruction translation lookaside buffer (ITLB), are typically performed, for instance, for each instruction cache line segment. Therefore, if there are four or eight segments in an instruction cache line, then either four or eight times in a cache line the same information is being examined to determine whether the address stored in the same entry corresponds to the same address that is coming from the directories.

By way of enhancement, selective suppression of one or more instruction cache-related directory accesses is disclosed herein which is based, in part, on determining that the next instruction fetch from the instruction cache is in the same cache line as a last instruction fetch to the instruction cache. By suppressing one or more cache-related directory accesses, the same cache line can continue to be accessed without needing to check whether there is an address match using the instruction cache-related directory access(es).

Figure 4A:
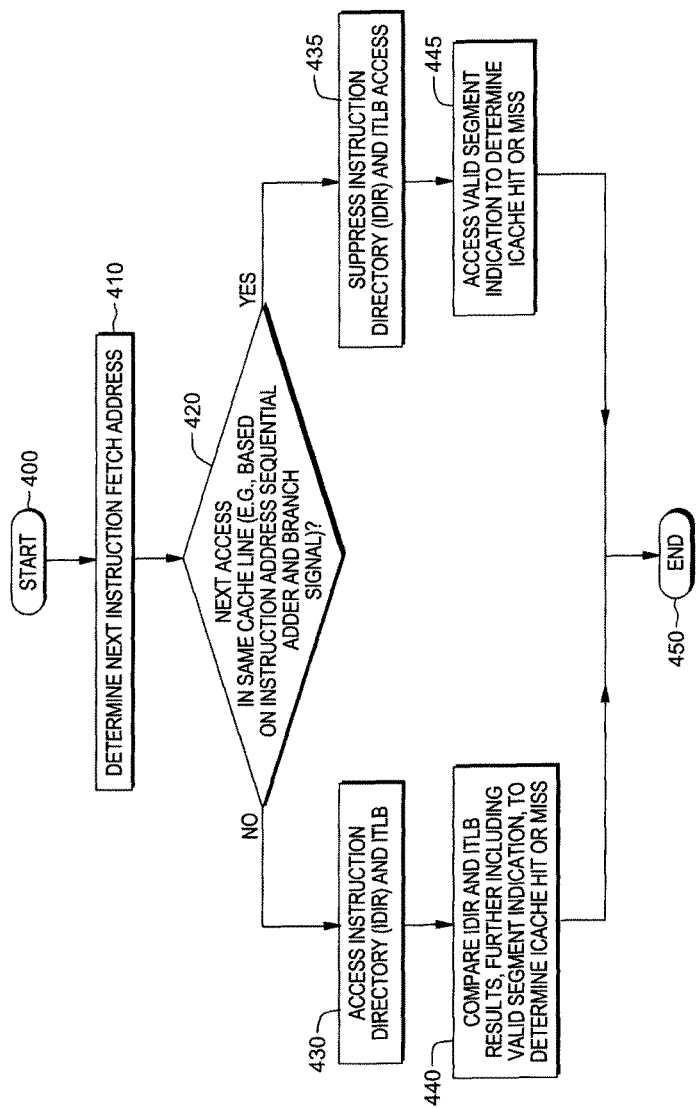
FIG. 4A is an example of one embodiment of logic for processing a next instruction fetch within an instruction cache complex, in accordance with one or more aspects of the present invention.

FIG. 4A depicts one embodiment of logic for processing a next instruction fetch within an instruction cache complex, in accordance with one or more aspects of the present invention. Note in this regard that an "instruction fetch" may be a fetch of one or more instructions. The logic begins 400 with determining a next instruction fetch address 410. This may be conventionally performed, for instance, by the select next virtual fetch address logic 317, which selects one of a computed branch target address 315, and a computed next sequential fetch address 318 of the instruction cache complex 300 of FIG. 3.

A determination is made whether the next instruction fetch is in a same cache line as the last instruction fetch, or more particularly, the same cache line as the present cache line 420. By way of example, this determination may use instruction address sequential adder logic and a branch or no-branch signal to determine whether the next instruction is from the same cache line. Assuming that the next instruction fetch is not in the same cache line, then the logic accesses the instruction directory (IDIR) and the instruction translation lookaside buffer (ITLB) 430 in the conventional manner, with an address-compare of the IDIR and ITLB results, and further consideration of the validity information, to determine whether there is an instruction cache hit or miss 440, which completes the cache hit/miss processing 450.

Assuming that the next instruction fetch is from the same cache line as the last instruction fetch 420, then the instruction directory (IDIR) and instruction translation lookaside buffer (ITLB) accesses are suppressed 435, which may be facilitated by generating a known-to-hit signal, described below with reference to FIG. 4B. By combining the known-to-hit signal (which is alternatively referred to herein as the address match signal) with the line segment validity information, a determination can be made whether there is an instruction cache hit or miss 445, which completes the cache hit/miss processing 450. As noted, in one or more implementations, the validity information may include a validity bit for each cache line segment, and in accordance with the present invention, be maintained in a cycle-boundary latch, such as cycle-boundary latch 321 (FIG. 3), for the same cache line as a result of a most-recent, instruction cache-directory-accessed fetch in the same cache line to be accessed in conjunction with multiple cache line accesses of the present cache line without a separate IDIR access, and distinct from the prior art which retains data in CBLs only for the processing during the subsequent cycle. Note that the most-recent, instruction cache-related-directory access fetch refers to the most-recent instruction fetch in the same cache line where the convention cache-related-directory accesses were performed using, for instance, the instruction directory (IDIR) and instruction translation lookaside buffer (ITLB) and associated logic, such as described above in the exemplary embodiment of FIG. 3.

Figure 4B:
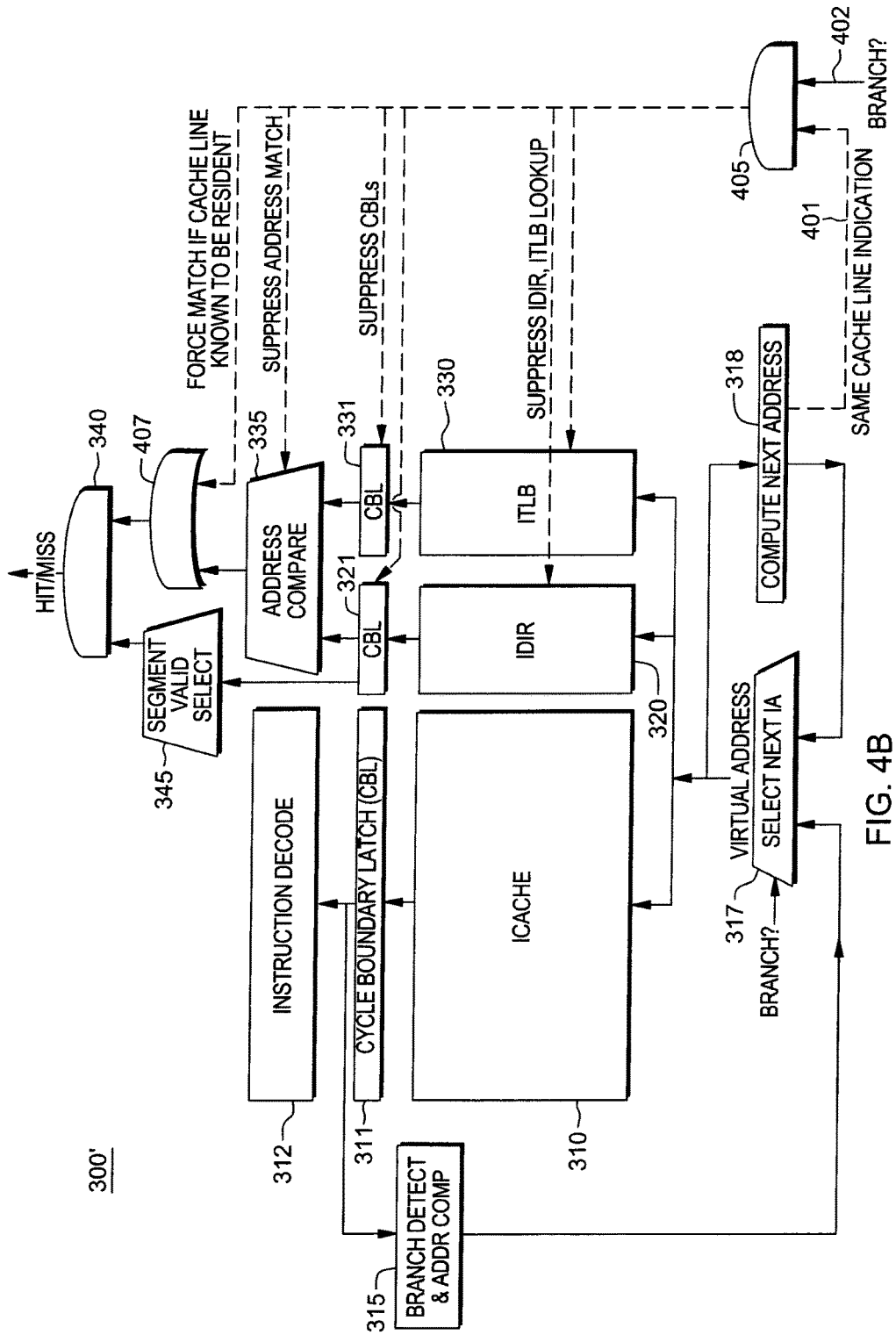
FIG. 4B is a schematic of another embodiment of an instruction cache complex, providing selective suppression of one or more instruction cache-related directory accesses for a next instruction fetch pursuant to, for instance, the logic embodiment of FIG. 4A, in accordance with one or more aspects of the present invention.

FIG. 4B depicts an instruction cache complex 300' similar to instruction cache complex 300 of FIG. 3, but with exemplary suppression logic added, in accordance with one or more aspects of the present invention. The depicted complex also uses CBL 321 to retain at least cache validity information from a cache access for processing not only in the next processing cycle, but also in processing cycles following subsequent cache accesses to one or more additional cache line segments of the present cache line, in accordance with the present invention. The suppression logic includes, in one or more implementations, known-to-hit logic 405, such as an AND circuit, which generates a known-to-hit signal when input on lines 401, 402 indicate that the next instruction fetch is from the same cache line as the last instruction fetch, and the last (i.e., most-recent) instruction fetch is not a branch instruction. The same cache line indication on line 401 may be provided by, for instance, the compute-next address 318 logic (FIG. 4A), and the branch instruction indication may be provided by at least one of, for example, the branch detect and branch target computation logic 315 (FIG. 4A) and branch prediction logic (not shown), as depicted by way of example in FIG. 4B. Assuming that the known-to-hit signal is generated by known-to-hit logic 405, then the signal may be employed to suppress for the next instruction fetch access to instruction directory (IDIR) 320 and access to instruction translation lookaside buffer (ITLB) 330, as well as to suppress, for the next instruction fetch, operation of cycle-boundary latches 321, 331, and address-compare logic 335, thereby reducing computations and saving energy. In one embodiment, this is achieved respectively by array clock-gating, and CBL latch clock-gating. In another embodiment, when the array may not be clock-gated in its entirety, it may be clock-gated partially on a cycle-by-cycle basis—and especially if the array correspondences to a multicycle access, in accordance with, for example, U.S. Patent Publication No. 2008/0164933 A1. Logic 407, such as an OR circuit, may be added to force an address match signal if the same cache line is known to be resident in the instruction cache, that is, if the known-to-hit signal has been generated. Assuming that the validity information is valid for the corresponding instruction cache line segment, then an instruction cache hit for the next instruction is indicated by hit/miss logic 340.

Figure 5A:
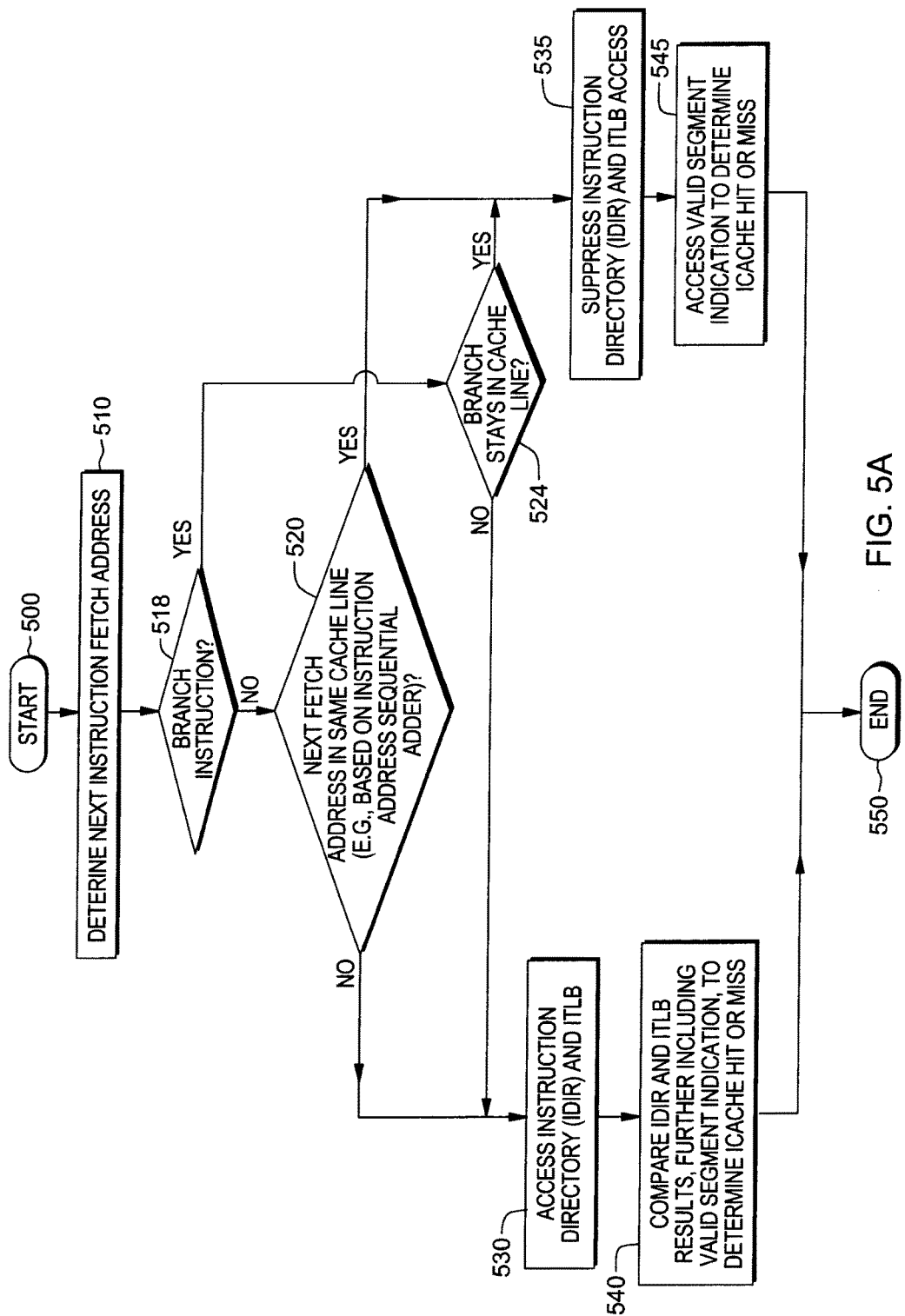
FIG. 5A is an example of another embodiment of logic for processing a next instruction fetch within an instruction cache complex, in accordance with one or more aspects of the present invention.
Figure 5B:
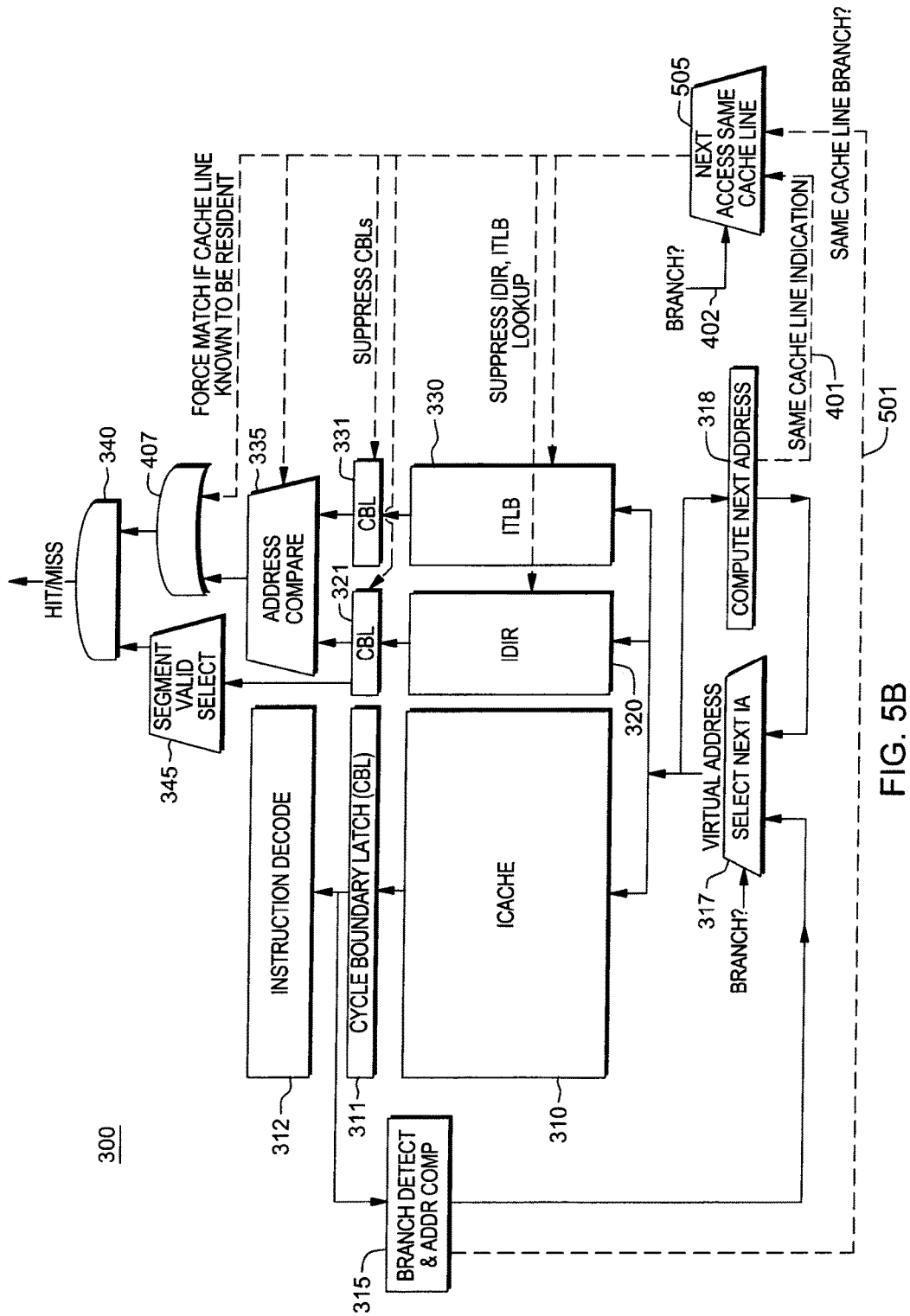
FIG. 5B is a schematic of another embodiment of an instruction cache complex, providing selective suppression of one or more instruction cache-related directory accesses for a next instruction fetch pursuant to, for instance, the logic embodiment of FIG. 5A, in accordance with one or more aspects of the present invention.

FIGS. 5A & 5B depict another embodiment of logic for processing a next instruction fetch within an instruction cache complex, in accordance with one or more aspects of the present invention.

Referring to FIG. 5A, processing starts 500 with determining a next instruction fetch address 510, which may be conventionally ascertained. A determination is then made whether the last instruction was a branch instruction 518. If a branch instruction was not present, control transfers to 520. If a branch instruction was present (either as determined by branch determination logic 315 of FIG. 5B, or branch prediction), a determination is made whether the branch instruction stayed in the same cache line 524. If the branch does not stay in the same cache line ("no"), then the instruction directory (IDIR) and the instruction translation lookaside buffer (ITLB) are accessed 530 in the conventional manner, with the address-compare of the IDIR and ITLB results, and further consideration of the validity information, to determine whether there is an instruction cache hit or miss 540, which completes the cache hit/miss processing 550. If the branch stays in the same cache line ("yes"), then the control transfers to 535 because a segment of the present cache line is being accessed.

Assuming that branch has not been found, then a determination is made whether the next instruction fetch is from a same cache line as the last instruction fetch, or, more particularly, the same cache line as the present cache line 520. By way of example, this determination may employ instruction address sequential adder logic to determine whether the next instruction is in the same cache line. Assuming that the next instruction fetch is not in the same cache line, then the instruction directory (IDIR) and instruction translation lookaside buffer (ITLB) are accessed 530 in the conventional manner, with an address-compare of the IDIR and ITLB results, and further consideration of the validity information, to determine whether there is an instruction cache hit or miss 540, which completes the cache hit/miss processing 550.

Assuming that the last instruction was not a branch instruction 522, or if a branch instruction, that it stayed in the same cache line 524, then the instruction directory (IDIR) and instruction translation lookaside buffer (ITLB) accesses are suppressed 535, which may be facilitated by generating a known-to-hit signal such as described herein. By combining the known-to-hit signal (or address match signal) with the line segment validity information, a determination is made whether there is an instruction cache hit or miss 545, which completes the cache hit/miss processing 550.

The instruction cache complex of FIG. 5B is similar to instruction cache complex 300' described above in connection with FIG. 4B. An exception is that known-to-hit logic 405 (FIG. 4B) is replaced with next-address-same-cache-line logic 505, which determines whether the next instruction fetch accesses the same cache line. In this implementation, logic 505 determines whether the last instruction was a branch instruction 402, and if so, looks for a same cache line indication on line 401 and a branch to the same cache line indication on line 501. If the last instruction was not a branch instruction, or if it was a branch instruction, and it stayed within the same cache line, then a known-to-hit signal is generated by logic 505. Assuming that the known-to-hit signal is generated, then the signal may be employed to suppress for the next instruction fetch access to instruction directory (IDIR) 320 and instruction translation lookaside buffer (ITLB) 330, as well as to suppress, for the next instruction fetch, operation of cycle-boundary latches 321, 331, and the address-compare logic 335, thereby reducing directory-related computations and saving energy. As explained above, logic 407 forces an address match signal if the same cache line is known to be resident in the instruction cache, that is, if the known-to-hit signal (or address match signal) has been generated. Assuming that the validity information is valid for the corresponding instruction cache line segment, then an instruction cache hit for the next instruction is indicated by hit/miss logic 340.

Figure 6A:
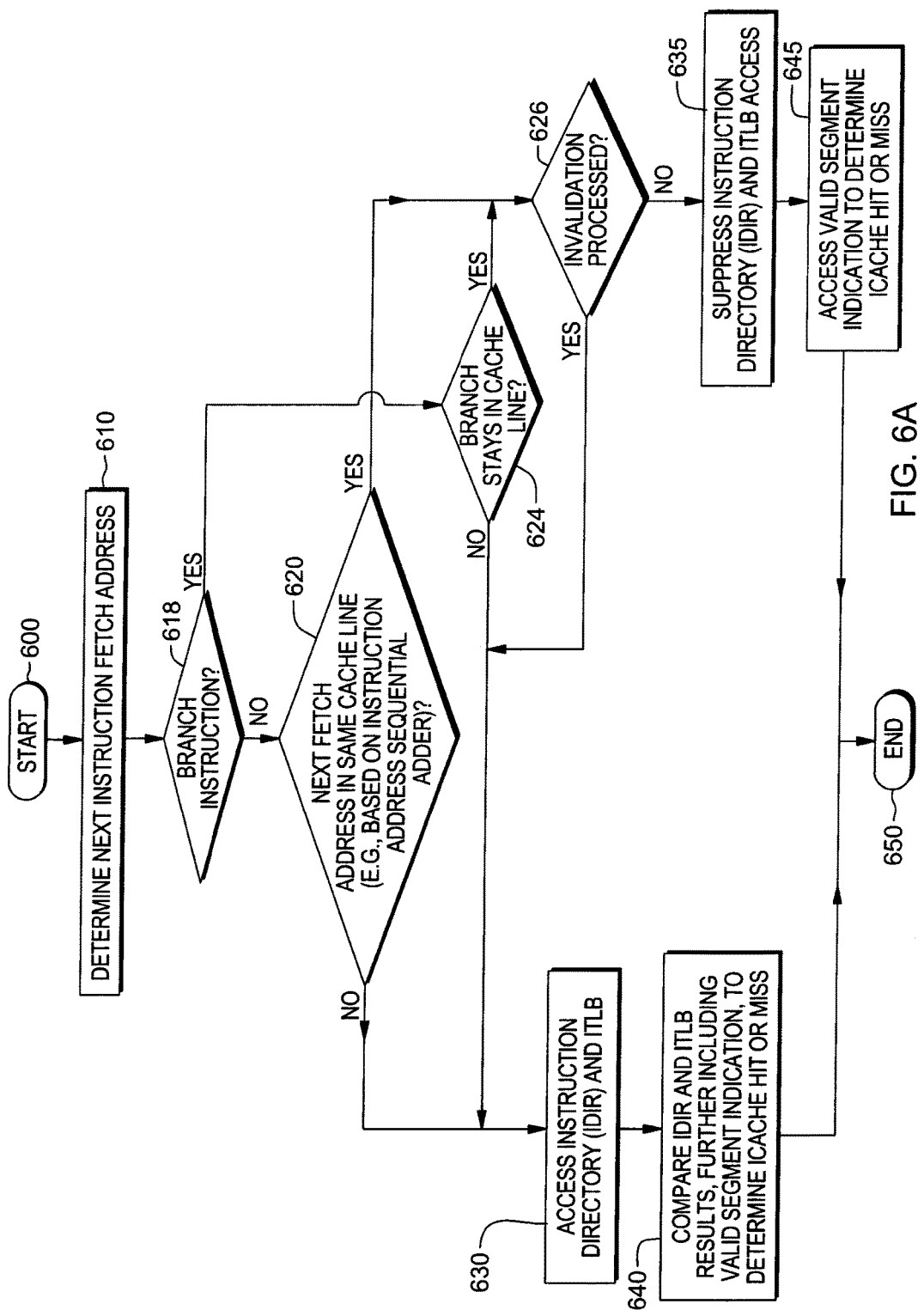
FIG. 6A is an example of a further embodiment of logic for processing a next instruction fetch within an instruction cache complex, in accordance with one or more aspects of the present invention.
Figure 6B:
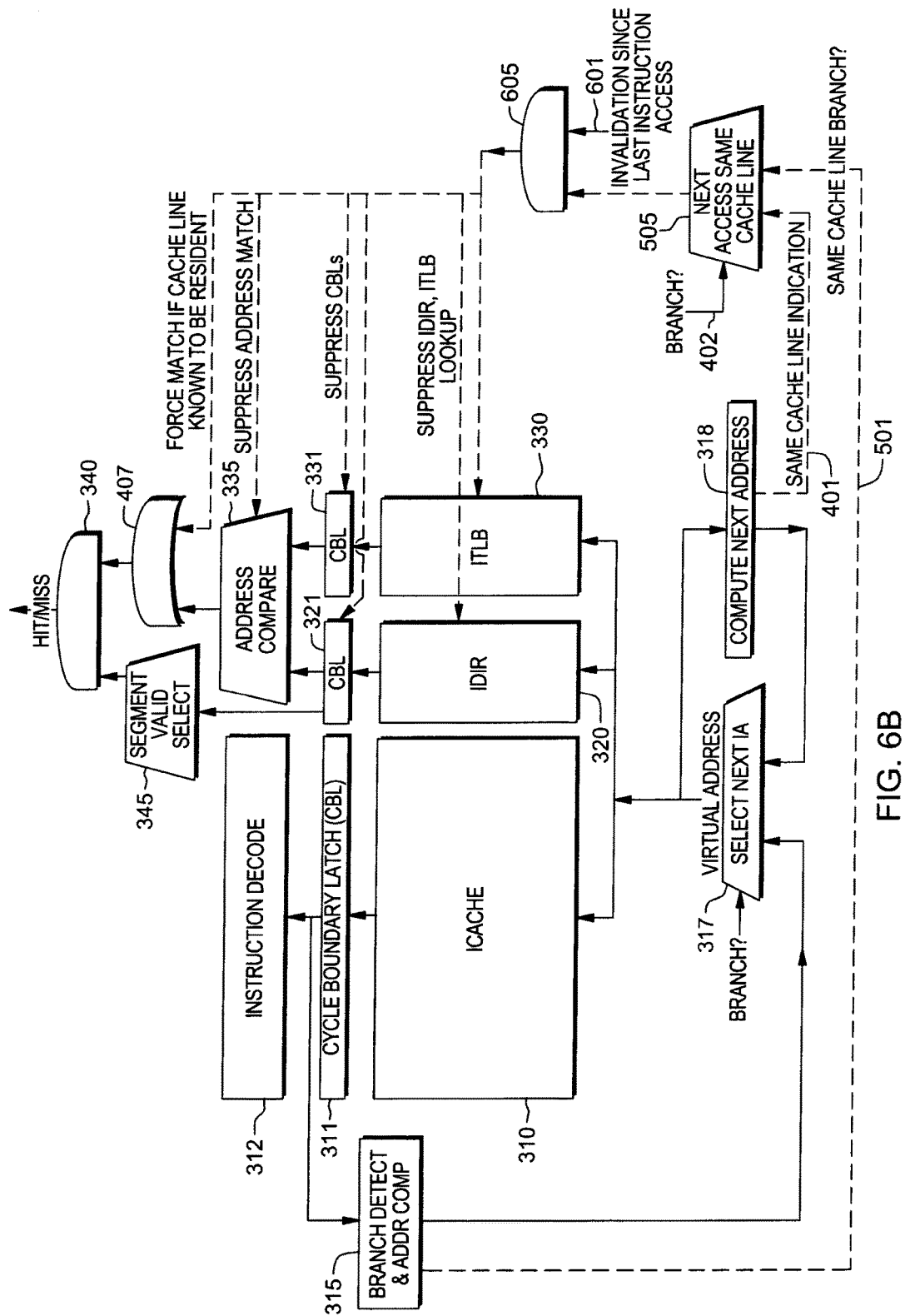
FIG. 6B is a schematic of a further embodiment of an instruction cache complex, providing selective suppression of one or more instruction cache-related directory accesses for a next instruction fetch pursuant to, for instance, the logic embodiment of FIG. 6A, in accordance with one or more aspects of the present invention.

FIGS. 6A & 6B depict a further embodiment of logic for processing a next instruction fetch within an instruction cache complex, in accordance with one or more aspects of the present invention. This logic is similar to that described above in connection with FIGS. 5A & 5B, but with the addition of logic 605 (FIG. 6B), to cancel or negate a known-to-hit signal generated by logic 505 should an invalidation action 601 occur invalidating the same cache line, that is, causing the cache line to no longer be valid. By way of example, the invalidation action may be any action which causes a verified cache line access to no longer be valid. For instance, the invalidation action may include changing validity of a translation, or other protocol action impacting validity of the translation, causing a cache line to be lost, etc.

As depicted in FIG. 6A, processing starts 600 with determining a next instruction fetch address 610, which may be conventionally ascertained. A determination is then made whether the last instruction was a branch instruction 618. If a branch instruction was not present, control transfers to 620. If a branch instruction was present (either as determined by branch determination logic 315 of FIG. 6B or branch prediction), a determination is made whether the branch instruction stayed in the same cache line 624. If the branch does not stay in the same cache line ("no"), then the instruction directory (IDIR) and the instruction translation lookaside buffer (ITLB) are accessed 630 in the conventional manner, with the address-compare of the IDIR and ITLB results, and further consideration of the validity information, to determine whether there is an instruction cache hit or miss 640, which completes the cache hit/miss processing 650. If the branch stays in the same cache line ("yes"), then the control transfers to determine whether an invalidation has been processed 626, because a segment of the present cache line is being addressed.

Assuming that a branch has not been found 620, then a determination is made whether the next instruction fetch is from a same cache line as the last instruction fetch, or more particularly, is in the same cache line as the present cache line 620. By way of example, this determination may employ instruction address sequential adder logic and a branch or no-branch signal, to determine whether the next instruction is in the same cache line. Assuming that the next instruction fetch is not in the same cache line, then the instruction directory (IDIR) and instruction translation lookaside buffer (ITLB) are accessed 630 in the conventional manner, with an address-compare of the IDIR and ITLB results, and further consideration of the validity information, to determine whether there is an instruction cache hit or miss 640, which completes the cache hit/miss processing 650.

Assuming that a branch instruction was present 618, and that the branch instruction did not stay in the same cache line 624, then the instruction directory (IDIR) and the instruction translation lookaside buffer (ITLB) are accessed 630 in the conventional manner, with the address-compare of the IDIR and ITLB, and further consideration of the validity information, to determine whether there is an instruction cache hit or miss 640, which completes the cache hit/miss processing 650.

Assuming that the instruction fetch stayed in the same cache line (either because it was not a branch instruction 618 and it was a sequential fetch 620 in the same cache line), or, if a branch instruction 622, that it stayed in the same cache line 624, then logic determines whether an invalidation of the cache line has been processed 626. If so, then the next instruction fetch is processed in the conventional manner 630, 640, 650. Otherwise, the instruction directory (IDIR) and instruction translation lookaside buffer (ITLB) accesses are suppressed 635, which as noted, may be facilitated by generating a known-to-hit signal such as described herein. By combining the known-to-hit signal (or address match signal) with the line segment validity information, a determination is made whether there is an instruction cache hit or miss 645, which completes the cache hit/miss processing 650.

The instruction cache complex of FIG. 6B is similar to the instruction cache complexes described above in connection with FIGS. 4B & 5B. As noted, one exception is that logic 605 is added in the embodiment of FIG. 6B, which cancels or negates the known-to-hit signal generated by logic 505 should an invalidation action 601 occur invalidating the same cache line, resulting in the cache line being no longer valid. As depicted in FIG. 6B, assuming that there has not been an invalidation, and that a known-to-hit signal has been generated, then logic 605 propagates the known-to-hit signal to suppress for the next instruction fetch access to instruction directory (IDIR) 320 and instruction translation lookaside buffer (ITLB) 330, as well as to suppress, for the next instruction fetch, operation of cycle-boundary latches 321, 331, for example, by way of a feedback circuit where the value stored in a cycle is subsequently stored for another cycle, or by way of clock-gating, for instance, as described above, and the address-compare logic 335, thereby reducing computations and saving energy. Should an invalidation action be signaled to logic 605, then the invalidation signal negates the known-to-hit signal generated by logic 505, and conventional instruction cache directory accesses to IDIR 320 and ITLB 330 would be performed. Note in this regard that, the input on line 601 is assumed to be, for instance, a same or similar signal value as the known-to-hit signal input when there has not been invalidation of the cache line, thus resulting in propagation of the known-to-hit signal through logic 605. Logic 407 forces an address match signal if the same cache line is known to be resident in the same instruction cache, that is, if the known-to-hit signal (or address match signal) has been generated, and assuming that the validity information is valid for the corresponding instruction cache line segment, then an instruction cache hit for the next instruction is indicated by hit/miss logic 340.

Figure 6C:
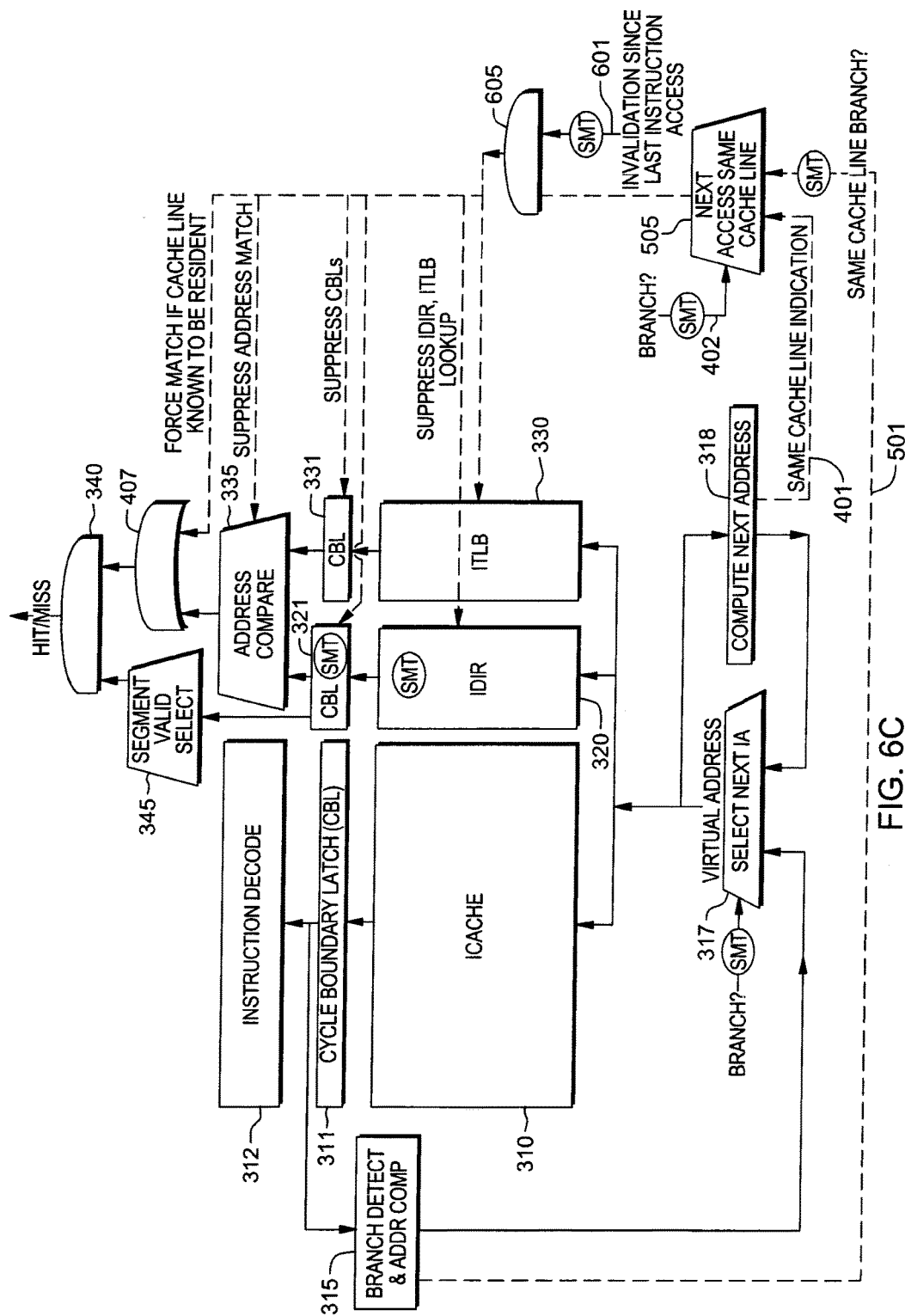
FIG. 6C depicts the instruction cache complex of FIG. 6B, and illustrates logic which would be repeated for each thread of multiple threads in a simultaneous multithreading (SMT) environment, in accordance with one or more aspects of the present invention.

FIG. 6C depicts the instruction cache complex of FIG. 6B, with an SMT indication added to certain logic locations and lines, which are repeated for each thread in a simultaneous multi-threading (SMT) environment. In accordance with the SMT indication, logic corresponding thereto is commonly duplicated, and one of duplicated outputs and/or actions of duplicated logic may be selected responsive to an SMT thread selection indication (not shown). In accordance with such an indication, in particular, multiple fetch addresses corresponding to each one of the SMT simultaneous thread fetch addresses are maintained and used for fetch 317, and a branch indication is further adapted to indicate the presence of a branch for a particular one of the SMT threads. Further, SMT selection is performed to select for each of the multiple threads whether for that thread a fetch is from the same cache line as a previous fetch 505. Further, validity bits for a plurality of must-recently-accessed instruction cache lines for each thread are maintained, with a selection performed to select the cache segment validity of a currently-processed thread, when cache segment validity information is being accessed.

Figure 7A:
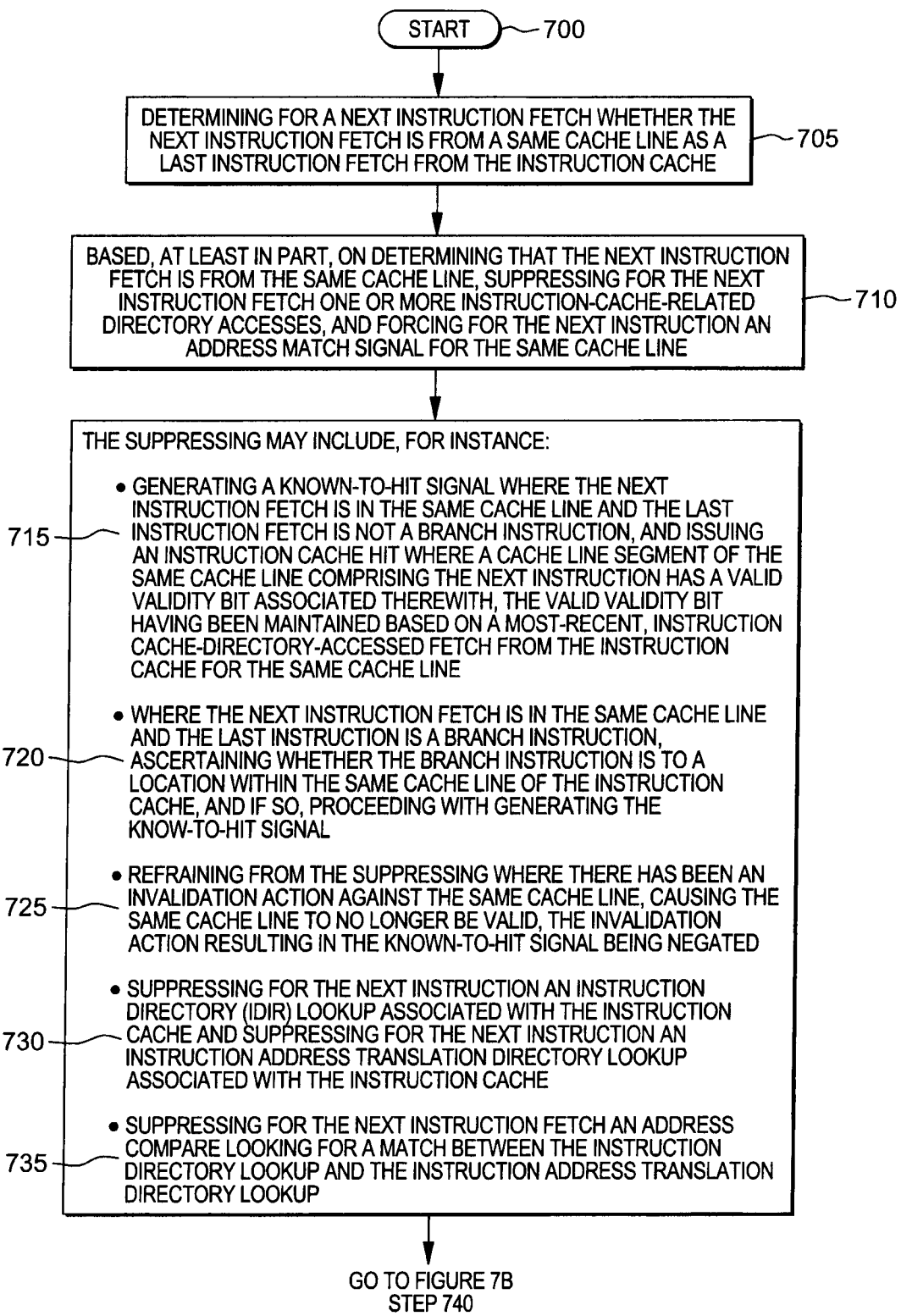
FIGS. 7A & 7B depict still another embodiment of logic for processing a next instruction fetch within an instruction cache complex, in accordance with one or more aspects of the present invention.
Figure 7B:
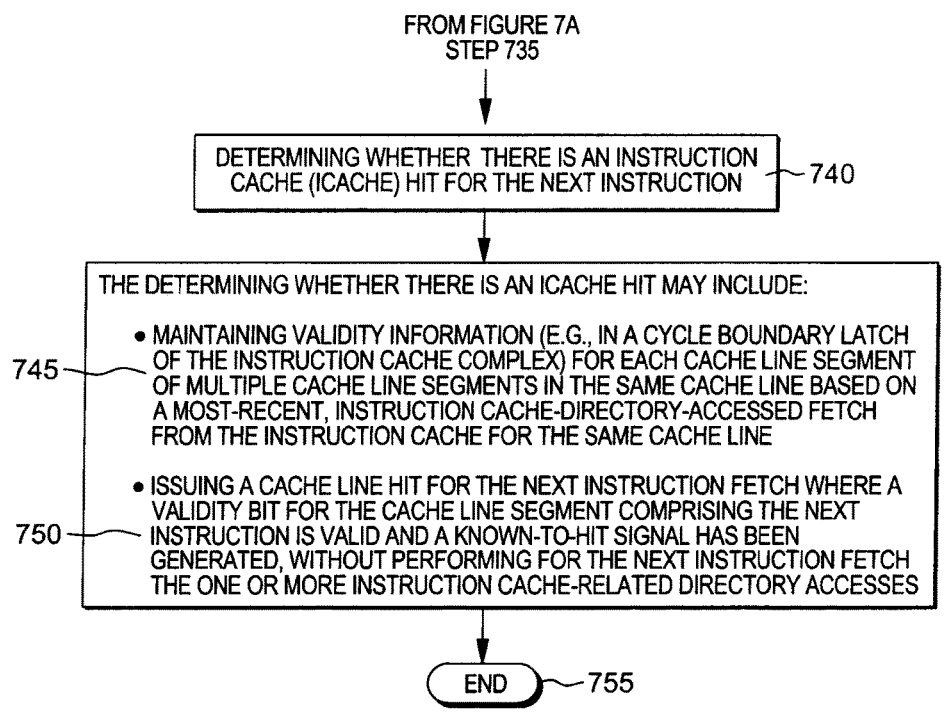

FIGS. 7A & 7B depict a further embodiment of logic for processing a next instruction fetch within an instruction cache complex.

Referring to FIG. 7A, the processing starts 700 with determining for a next instruction fetch whether the next instruction fetch is in a same cache line as a last instruction fetch from the instruction cache 705. Based, at least in part, on determining that the next instruction fetch is in the same cache line, the logic may suppress for the next instruction fetch one or more instruction cache-related-directory accesses, and force for the next instruction an address match signal for the same cache line 710.

The suppressing of the one or more instruction cache-related-directory accesses may include, for instance: generating a known-to-hit signal where the next instruction fetch is in the same cache line and the last instruction fetch is not a branch instruction, and issuing an instruction cache hit where a cache line segment of the same cache line comprising the next instruction has a valid validity bit associated therewith, the valid validity bit having been maintained based on a most-recent, instruction cache-directory-accessed fetch from the instruction cache for the same cache line 715; where the instruction fetch is in the same cache line and the last instruction is a branch instruction, ascertaining whether the branch instruction is to a location within the same cache line of the instruction cache, and if so, proceeding with generating the known-to-hit signal 720; refraining from the suppressing where there has been an invalidation action against the same cache line, causing the same cache line to no longer be valid, the invalidation action resulting in the known-to-hit signal being negated 725; suppressing for the next instruction fetch an instruction directory (IDIR) lookup associated with the instruction cache and suppressing for the next instruction fetch an instruction address translation directory lookup associated with the instruction cache 730; and/or suppressing for the next instruction fetch an address-compare looking for a match between the instruction directory lookup and the instruction address translation directory lookup 735.

The logic may further include determining whether there is an instruction cache (ICACHE) hit for the next instruction fetch 740. The determining whether there is an ICACHE hit includes, for instance: maintaining validity information (e.g., in a cycle-boundary latch of the instruction cache complex) for each cache line segment of multiple cache line segments in the same cache line based on a most-recent, instruction cache-directory-accessed fetch from the instruction cache for the same cache line 745; and/or issuing a cache line hit for the next instruction fetch where a validity bit for the cache line segment comprising the next instruction is valid, and a known-to-hit signal has been generated, without performing for the next instruction fetch the one or more instruction cache-related directory accesses 750. This completes 760 the exemplary logic embodiment of FIGS. 7A & 7B.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 1. Computer system/server 102 of FIG. 1 may be practiced in distributed cloud computing environments where tasks are performed by remote processing devices that are linked through a communications network. In a distributed cloud computing environment, program modules may be located in both local and remote computer system storage media including memory storage devices. Computer system/server 102 is capable of being implemented and/or performing any of the functionality set forth hereinabove.

Figure 8:
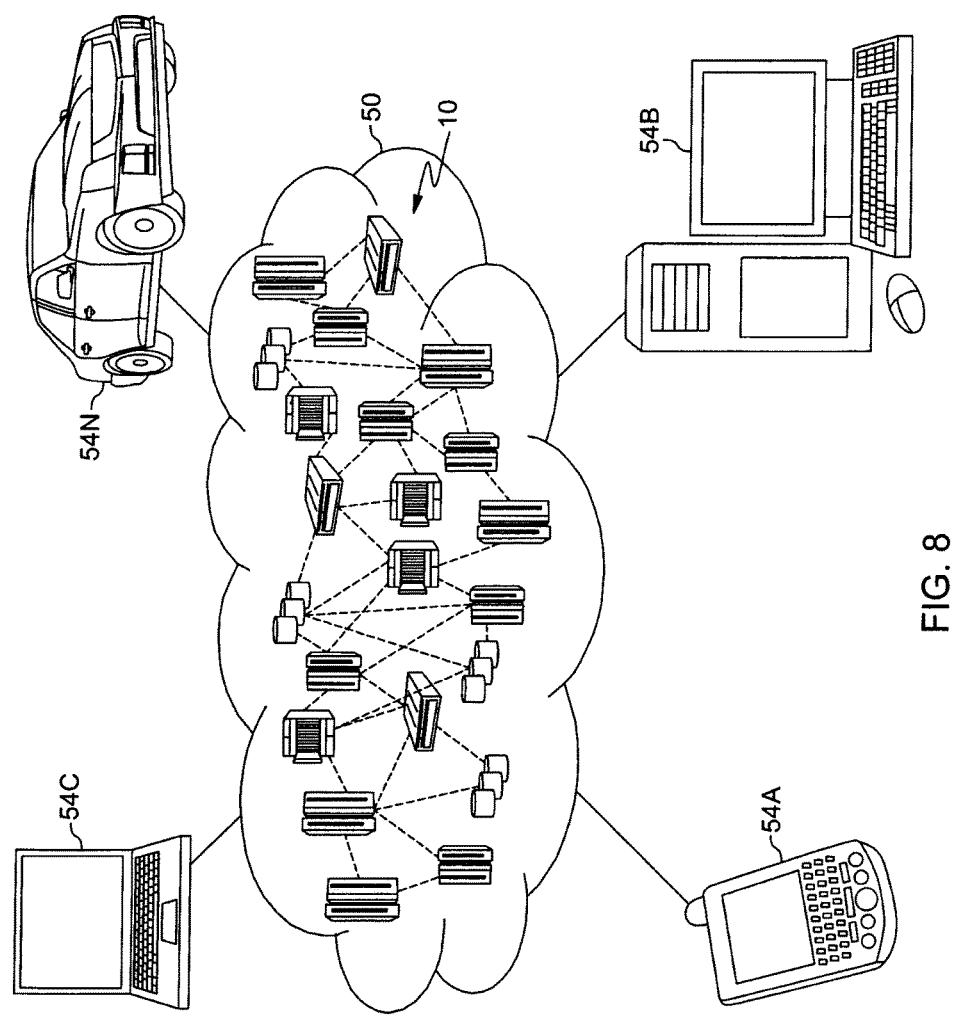
FIG. 8 depicts one embodiment of a cloud computing environment.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 9:
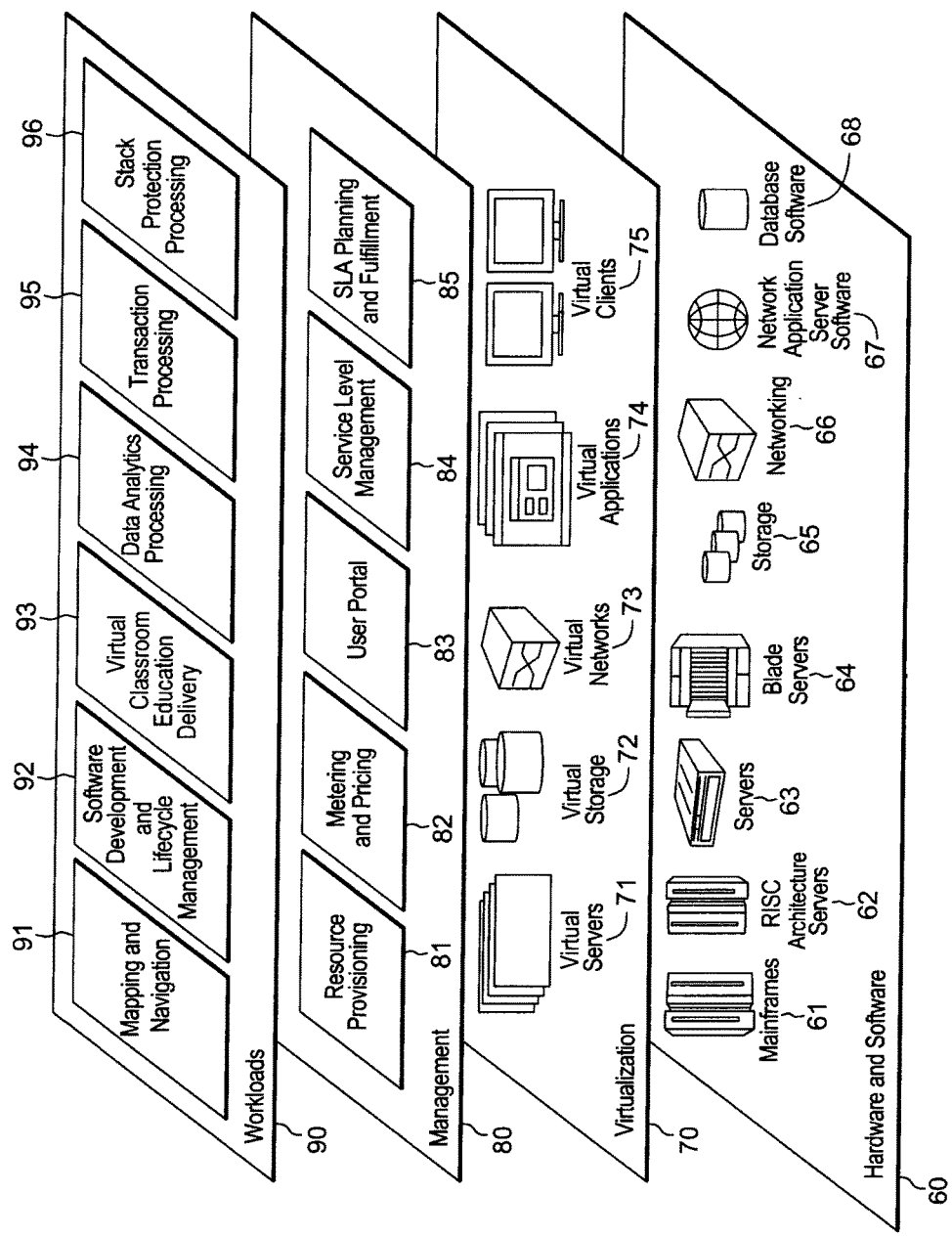
FIG. 9 depicts one example of abstraction model layers.

Referring now to FIG. 9, a set of functional abstraction layers provided by cloud computing environment 50 (FIG. 17) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and stack protection processing 96.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.), can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A method of processing an instruction fetch from an instruction cache, the method comprising: determining for a next instruction fetch whether the next instruction fetch is in a same cache line of the instruction cache as a last instruction fetch from the instruction cache; and based, at least in part, on determining that the next instruction fetch is in the same cache line, suppressing for the next instruction fetch one or more instruction cache-related directory accesses, forcing for the next instruction fetch an address match signal for the same cache line, and refraining from the suppressing where there has been an invalidation action against the same cache line, which causes the same cache line to no longer be valid, the invalidation action result in a known-to-hit signal being negated.

2. The method of claim 1, wherein the suppressing comprises generating a known-to-hit signal where the next instruction fetch is in the same cache line and the last instruction fetch is not a branch instruction, and issuing an instruction cache hit where a cache line segment of the same cache line comprising the next instruction has a valid validity bit associated therewith, the valid validity bit having been retrieved and maintained based on a most-recent, instruction cache-directory-accessed fetch for the same cache line.

3. The method of claim 2, further comprising, where the next instruction fetch is in the same cache line and the last instruction is a branch instruction, ascertaining whether the branch instruction is to a location within the same cache line of the instruction cache, and if so, proceeding with generating the known-to-hit signal.

4. The method of claim 2, further comprising refraining from the suppressing where there has been an invalidation action against the same cache line, causing the same cache line to no longer be valid, the invalidation action resulting in the known-to-hit signal being negated.

5. The method of claim 1, wherein the same cache line comprises multiple cache line segments, each cache line segment comprising multiple instructions, and wherein the method further comprises maintaining validity information for each cache line segment of the multiple cache line segments based on a most-recent, instruction cache-directory-accessed fetch for the same cache line.

6. The method of claim 5, wherein the suppressing comprises generating a known-to-hit signal based, at least in part, on the determining that the next instruction fetch is in the same cache line, and wherein the method further comprises issuing a cache line hit for the next instruction fetch where the separate validity bit for the cache line segment comprising the next instruction is valid and the known-to-hit signal has been generated, without performing for the next instruction fetch the one or more instruction cache-related directory accesses.

7. The method of claim 5, wherein maintaining the validity information comprises maintaining separate validity bits for each cache line segment in a cycle-boundary latch of an instruction cache complex comprising the instruction cache.

8. The method of claim 1, wherein the suppressing further comprises suppressing for the next instruction fetch an address-compare looking for a match between an instruction directory lookup and an instruction address translation directory lookup for the next instruction fetch.

9. A system for processing an instruction fetch from an instruction cache, the system comprising: a memory; and a processor communicatively coupled to the memory, where the system performs a method comprising: determining for a next instruction fetch whether the next instruction fetch in a same cache line of the instruction cache as a last instruction fetch from the instruction cache; and based, at least in part, on determining that the next instruction fetch is in the same cache line, suppressing for the next instruction fetch one or more instruction cache-related directory accesses, forcing for the next instruction fetch an address match signal for the same cache line, and refraining from the suppressing where there has been an invalidation action against the same cache line, which causes the same cache line to no longer be valid, the invalidation action result in a known-to-hit signal being negated.

10. The system of claim 9, wherein the suppressing comprises generating a known-to-hit signal where the next instruction fetch is in the same cache line and the last instruction fetch is not a branch instruction, and issuing an instruction cache hit where a cache line segment of the same cache line comprising the next instruction has a valid validity bit associated therewith, the valid validity bit having been retrieved and maintained based on a most-recent, instruction cache-directory-accessed fetch for the same cache line.

11. The system of claim 10, further comprising, where the next instruction fetch is in the same cache line and the last instruction is a branch instruction, ascertaining whether the branch instruction is to a location within the same cache line of the instruction cache, and if so, proceeding with generating the known-to-hit signal.

12. The system of claim 9, wherein the same cache line comprises multiple cache line segments, each cache line segment comprising multiple instructions, and wherein the system further maintains validity information for each cache line segment of the multiple cache line segments based on a most-recent, instruction cache-directory-accessed fetch for the same cache line.

13. The system of claim 12, wherein the suppressing comprises generating a known-to-hit signal based, at least in part, on the determining that the next instruction fetch is in the same cache line, and wherein the system further issues a cache line hit for the next instruction fetch where the separate validity hit for the cache line segment comprising the next instruction is valid and the known-to-hit signal has been generated, without performing for the next instruction fetch the one or more instruction cache-related directory accesses.

14. A computer program product for processing an instruction fetch from an instruction cache, computer program product comprising: a non-transitory computer readable storage medium having program instructions embodied therewith, the program instructions being executable by a processing circuit to cause the processing circuit to perform a method comprising: determining for a next instruction fetch whether the next instruction fetch is in a same cache line of the instruction cache as a last instruction fetch from the instruction cache; and based, at least in part, on determining that the next instruction fetch is in the same cache line, suppressing for the next instruction fetch one or more instruction cache-related directory accesses, forcing for the next instruction fetch an address match signal for the same cache line, and refraining from the suppressing where there has been an invalidation action against the same cache line, which causes the same cache line to no longer be valid, the invalidation action result in a known-to-hit signal being negated.

15. The computer program product of claim 14, wherein the suppressing comprises generating a known-to-hit signal where the next instruction fetch is in the same cache line and the last instruction fetch is not a branch instruction, and issuing an instruction cache hit where a cache line segment of the same cache line comprising the next instruction has a valid validity bit associated therewith, the valid validity bit having been retrieved and maintained based on a most-recent, instruction cache-directory-accessed fetch for the same cache line.

16. The computer program product of claim 15, further comprising, where the next instruction fetch is in the same cache line and the last instruction is a branch instruction, ascertaining whether the branch instruction is to a location within the same cache line of the instruction cache, and if so, proceeding with generating the known-to-hit signal.

\* \* \* \* \*